Aug. 10, 1965  G. R. McEATHRON  3,199,523
POWER PLANT SAFETY SYSTEM
Filed June 12, 1961
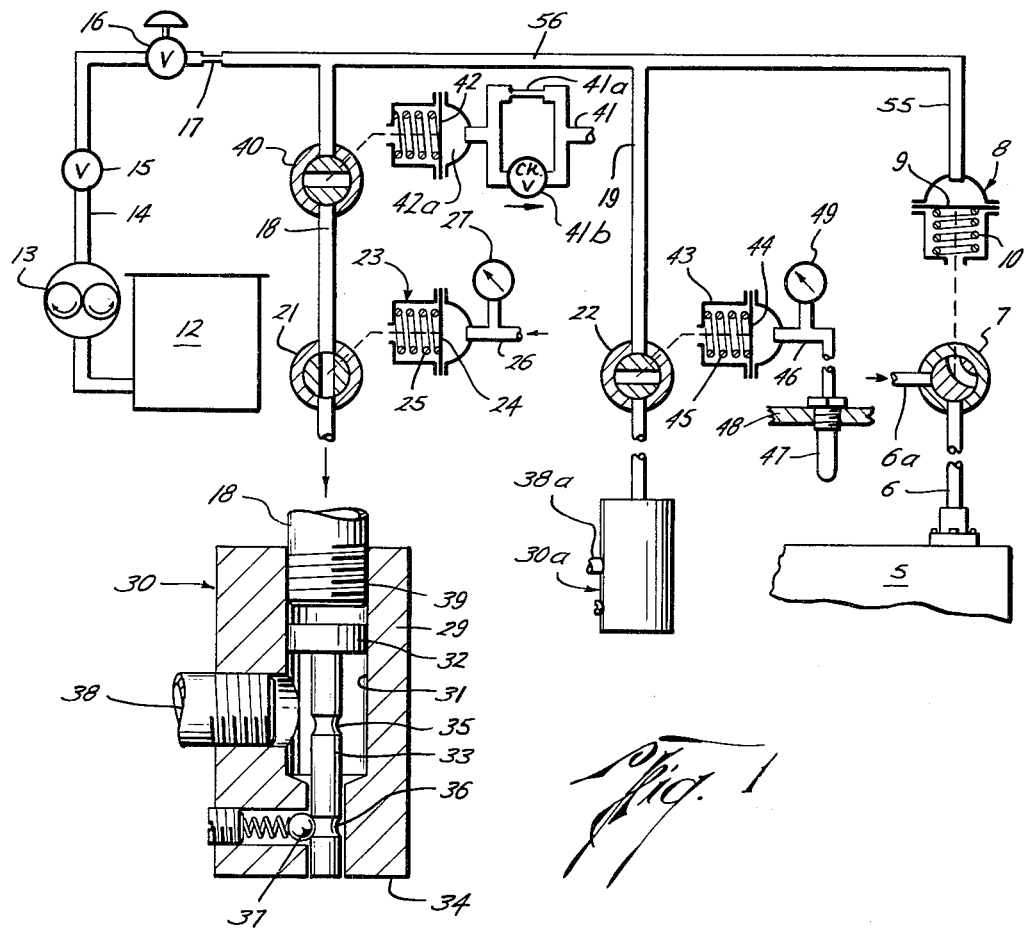
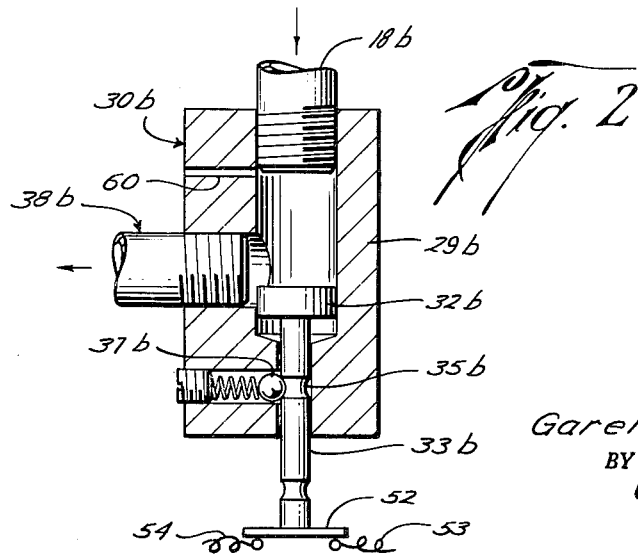
INVENTOR.
Gareld R. McEathron
BY Bertram H. Mann
ATTORNEY

United States Patent Office 3,199,523
Patented Aug. 10, 1965

3,199,523
POWER PLANT SAFETY SYSTEM
Careld R. McEathron, 5323 Northridge, Houston 33, Tex.
Filed June 12, 1961, Ser. No. 116,540
3 Claims. (Cl. 137—26)

This invention relates to safety systems for power plants, particularly, internal combustion engines and transmissions which must operate for substantial periods without the attention of an operator.

Such power plants are utilized, for instance, in pumping and booster stations connected in gas pipe lines. These engines, under normal conditions, must operate for long periods without inspection. However, under abnormal conditions, which are signalled, for instance, by increasing temperature of cooling water, subnormal lubricating oil pressure and/or temperature, and overspeeding, the engine requires prompt attention to avoid damage thereto and possible breakdown. Devices have been provided which stop the engine upon the occurrence of various abnormal operating conditions. However, where a number of such safety devices are applied to the engine, no means has been provided for quickly indicating the particular breakdown or abnormal point.

Furthermore, where the emergency system functions to actuate a control device for stopping the engine, such as the fuel valve, it is desirable that the device be provided with a spring or other biasing means for self-actuation, except under normal engine starting and operating conditions. Where the emergency cut-off system is pressure operated, as pneumatically or hydraulically, and normally holds the control device in normal running condition, it is important that the normal operating pressure in the system be markedly reduced under abnormal conditions so as to permit self-actuation of the device.

Accordingly, an object of the present invention is to provide a safety cut-off system for power plants which will indicate quickly the particular abnormal condition causing the shut-down.

Another object is to provide a power plant safety system of the fluid pressure type with means insuring marked reduction in the system fluid pressure under any abnormal operating condition which the system is designed to sense.

Another object is to provide a novel, inexpensive combination vent valve and signal for such an engine emergency system which is of relatively simple construction, particularly one which under normal operating conditions is not exposed to the fluid pressure of the emergency system.

Another object is to provide a power plant emergency system in which an abnormal operating condition is utilized to apply the pressure of the emergency system to a particular vent-indicator device which functions both to signal the location of the abnormal condition and to vent the emergency system.

These objects and other more detailed objects hereafter appearing are attained in the system and structures illustrated in the accompanying drawings, in which FIG. 1 is a largely diagrammatic representation of an emergency shut-down system applied to the main fuel supply of an internal combustion engine, and FIG. 2 is an enlarged sectional view showing one of the novel vent-signal devices in shut-down position, the device being slightly modified from that shown in FIG. 1.

FIG. 1 shows at 5 a portion of an internal combustion engine, which may be the prime mover of a pressuring station connected to a gas pipe line. A main fuel supply pipe 6, 6a connects the engine with a main fuel valve 7 and the fuel metering controls. Valve 7 is operated by a fluid motor device of the diaphragm type, represented generally at 8. The diaphragm 9 of the control is normally urged by a coiled spring 10 in the direction to close valve 7 for shutting off the supply of fuel to the engine.

The emergency shut-off system is of the pneumatic type and includes any suitable source of pressured air or other gas, represented schematically by the tank 12 and tubes leading therefrom. The gas for the system may be pressured additionally, as by a pump 13, and led through piping 14 and a control valve 15, a pressure regulator 16, and an orifice 17 to a plurality of branches, as 18 and 19. Each of the branches 18 and 19 is provided with a valve, as 21 and 22, which is controlled by a device for sensing an abnormal engine operating condition. For instance, valve 21 is controlled by a fluid motor 23, the diaphragm 24 of which is normally urged by a coiled spring 25 in the direction for opening valve 21. Piping 26 leads from the pressured lubricating oil system, and when the oil pressure is normal, urges control diaphragm 24 leftwardly in the direction to close valve 21. A gauge 27 may be provided to visually indicate the pressure in the lubricating system.

Branch piping 18 leads through valve 21 to one of the novel vent-signal valve devices, shown enlarged and sectioned and generally designated 30. The device includes a casing 29 having a working chamber 31 in which works a piston valve 32 from which projects a stem 33 which normally terminates substantially flush with end wall 34 of the casing 29. The piston stem has a pair of annular recesses 35 and 36 selectively cooperating with spring-pressed detent ball 37. In the normal position of the device, with no pressure applied to piston 32, ball 37 seats in outer recess 36 to stabilize the piston and stem. A vent connection 38 leads from chambers 31 on the side of piston 32 opposite connection 39 for branch piping 18. Piston 32 need not tightly or sealingly fit within chamber 31, but should slide rather freely therein.

In order to shield signal-vent device 30 from pressure under normal engine operating conditions, valve 21 and device 30 are connected to the pneumatic system through a normally closed, auxiliary valve 40 which may be opened after a predetermined time delay by the action of a fluid, such as the fuel gas itself fed from pipe 6 to pipe 41. When the flow of the fuel gas is initiated upon starting of the engine, diaphragm 42 is actuated to open valve 40 after a delay caused by restriction 41a. A check valve 41b parallel to restriction 41a permits quick evacuation of diaphragm chamber 42a. Valve 40 and its control are such as to delay the application of the emergency system line pressure to valve 21 and device 30 for an interval of time sufficient, under normal starting conditions, to permit the lubricant pressure acting on diaphragm 24 to build up to normal.

Valve 22 in branch line 19 is connected to a fluid motor control, generally designated 43 which has a diaphragm 44 normally urged by coiled spring 45 in the direction to close valve 22. The diaphragm is exposed through tubing 46 to a thermostatic bulb 47 shown mounted in a cooling liquid jacket 48. A gauge 49 may be provided for indicating the pressure condition in the thermostatic line and, therefore, the temperature of the liquid to which the bulb is exposed. Under normal temperatures of the cooling water or other liquid, during operation of the engine, the pressure in tubing 46 will be insufficient to shift diaphragm 44 against spring 45. Consequently, valve 22 will be normally closed so that signal-vent device 30a, normally, will be exposed to no pressure from the pneumatic system. Device 30a is provided with a vent 38a.

In FIG. 2 there is shown a modified signal-vent valve device 30b utilized to actuate a switch blade 52 in an electrical circuit 53—54 which may actuate a remote signalling device. In this figure, detent ball 37b is shown seated in innermost recess 35b and, of course, stem 33b is projected beyond casing 29b so as to be readily visible. Also, in this form, piston 32b is made of a material, such as rubber, having sufficient flexibility to yield upon the application thereto of the pressure of the pneumatic system, in case the piston should stick for any reason. If desired, a yielding relief valve or a small, constant vent 60 may be provided on the upstream side of piston 32b to insure venting of the safety system when an engine malfunction occurs.

Referring again to FIG. 1, diaphragm 9 of fluid motor 8 controlling fuel valve 7 is exposed to pressure fluid in branch line 55 leading from the line 56 of the pneumatic safety system.

It is believed the operation of the emergency system should be clear from the above description. The system may be provided with any number of branches, such as 18 and 19, for sensing any particular operating conditions of the power plant. The emergency system is normally pressured, by means of a valve 15, coincidentally with cranking of the engine. When the engine starts to run, the lubricating oil pressure will build up to its normal value so as to actuate motor 23 and close valve 21 before this valve is exposed, past the time delay valve 40, to the emergency line pressure. Valve 22 and corresponding control valves in branch lines leading to various other condition sensing instrumentalities, likewise, will be closed until the abnormal condition each is designed to sense occurs. At such time, pressure will be applied to a particular one of the signal-vent devices 30, 30a, 30b, etc. so as to shift its piston 32 and vent the emergency pressuring system. This, in turn, will markedly reduce the pressure on the downstream side of orifice 17 and the pressure applied through lines 56 and 55 to control motor 8. This permits spring 10 to shift diaphragm 9 to close main fuel valve 7 and, therefore, shut down the engine. Due to the signalling provided by stem 33, either visually due to relationship to a suitable index, as casing wall 34, or a visual or audible signal provided by remote control circuitry 53–54, the operator may readily determine the position of the abnormal condition responsible for the shutdown. The emergency line pressure is then cut off and the condition corrected. Thereupon, stem 33 is pushed into its casing by the operator and the engine may be restarted and the emergency line repressured as before.

Due to the fact that the novel signal-vent devices 30 will be pressured only during the relatively brief period between the sensing of an abnormal engine condition and the shutdown of the engine, these devices may be inexpensively constructed and of such small size as to be conveniently mounted with other instrumentation and circuitry upon a master control board or other positions for convenient observation and/or manipulation. Moreover, the device may be conveniently formed of transparent plastic material to provide further evidence of its internal condition. The apparatus may be applied to any type of power plant and may sense any desired operative condition thereof. Also, the apparatus may control other powering means, as the ignition system of a spark-ignition type of engine or the main control switch of an electric motor. The invention may be modified in these and other respects as will occur to those skilled in the art and the exclusive use of all modifications as come within the scope of the appended claims is contemplated.

I claim:

1. The combination in a power plant safety system comprising a control having power plant normal running and stopping positions, an instrumentality sensitive to the occurrence of an abnormal condition of the power plant, a source of pressured fluid, means normally urging said control to said stopping position, motor means operatively connected to said control, and a fluid line connecting said source to said motor means, of a pressure venting device comprising a casing forming a working chamber having spaced inlet and venting ports in the wall thereof, a plunger slidable in said chamber from a first position closing communication between said ports to a second position in which said ports are in communication through said working chamber, a fluid connection between said inlet port and said fluid line, a valve in said connection, and means operatively connecting said valve and said condition sensitive instrumentality for opening said valve responsive to an abnormality of the conditions sensed by said instrumentality to expose said inlet port and said plunger to pressure fluid from said fluid line and thereby cause shifting of said plunger to said second position with resultant venting of said fluid line and shifting of said control to said power plant stopping position.

2. The combination described in claim 1 in which said vent device and said valve are physically separated and, further, including an element on said plunger visible from the exterior of said working chamber for signalling the positioning of said plunger.

3. The combination described in claim 2 in which a plurality of said venting devices are provided, each having a connection to said fluid line with a valve therein and a plurality of engine condition sensing instrumentalities each connected to one of said latter valves.

References Cited by the Examiner

UNITED STATES PATENTS

| | | | |
|---|---|---|---|
| 2,112,664 | 3/38 | Dube | 123—41.5 |
| 2,314,965 | 3/43 | Sautu | 137—557 X |
| 2,538,281 | 1/51 | Snyder | 137—116 |
| 2,714,883 | 8/55 | Metzger | 123—198 |
| 3,075,537 | 1/63 | Puster | 137—16 |
| 3,107,693 | 10/63 | Puster | 137—627.5 X |
| 3,129,722 | 4/64 | Wagner | 137—554 X |

ISADOR WEIL, *Primary Examiner.*

KARL J. ALBRECHT, CLARENCE R. GORDON,
*Examiners.*